US007096007B2

(12) United States Patent
Ramaswamy et al.

(10) Patent No.: US 7,096,007 B2
(45) Date of Patent: Aug. 22, 2006

(54) MOBILE COMMUNICATION SYSTEM HAVING A DIRECT AND BROADCAST LINK

(75) Inventors: Kumar Ramaswamy, Plainsboro, NJ (US); Edwin Arturo Heredia, San Jose, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1016 days.

(21) Appl. No.: 09/757,315

(22) Filed: Jan. 9, 2001

(65) Prior Publication Data

US 2002/0090925 A1 Jul. 11, 2002

(51) Int. Cl.
*H04M 3/00* (2006.01)

(52) U.S. Cl. ............... 455/414.1; 455/420; 379/110.01; 725/105

(58) Field of Classification Search ................. 455/403, 455/420, 414, 517, 561, 562, 524, 414.1; 379/110, 110.01; 725/105
See application file for complete search history.

(56) References Cited

U.S. PATENT DOCUMENTS

| 4,481,382 | A | * | 11/1984 | Villa-Real | |
|---|---|---|---|---|---|
| 5,570,415 | A | * | 10/1996 | Stretton et al. | 379/110 |
| 5,898,919 | A | * | 4/1999 | Yuen | 455/420 |
| 6,122,263 | A | | 9/2000 | Dahlin et al. | 370/329 |
| 6,151,497 | A | | 11/2000 | Yee et al. | 455/430 |
| 6,154,649 | A | | 11/2000 | Reichstein | 455/426 |
| 6,349,409 | B1 | * | 2/2002 | Chan | 725/105 |
| 6,580,904 | B1 | * | 6/2003 | Cox et al. | 455/414 |
| 6,085,112 | A1 | | 7/2004 | Kleinschmidt et al. | 455/556 |

* cited by examiner

*Primary Examiner*—William Cumming

(57) ABSTRACT

A mobile communications system includes a plurality of mobile communications devices. A direct link communicates information between a communications network and a selected one of the plurality of mobile communications devices. A broadcast link simultaneously broadcasts information from the communications network intended to be receivable by the plurality of mobile communications devices.

22 Claims, 2 Drawing Sheets

MOBILE COMMUNICATION SYSTEM HAVING A DIRECT AND BROADCAST LINK

FIELD OF THE INVENTION

The present invention relates to a mobile, two-way, personal communications system.

BACKGROUND OF THE INVENTION

Personal communications systems (PCS) devices are based on mobile phone or cellular phone system devices. Mobile or cellular phone devices are currently configured to communicate with one of a plurality of permanently placed ground antennas, which, in turn, are connected to the telephone system: both to standard wired telephones and to other mobile or cellular telephone devices via other such ground antennas. The original cellular phone devices communicated via analog data signals. However, newer cellular phone devices communicate via digital data signals. In either case, there is a direct link between the telephone communications network and the cellular telephone.

Further capabilities are being added to the digital cellular phone devices. For example, digital cellular phone devices are being enhanced to enable them to receive digital data from and transmit digital data to a digital data network, such as the Internet, with which the telephone system is interconnected. Such devices have been termed personal communications systems (PCS) devices. Such enhanced PCS devices can request, receive and display information from the internet such as, for instance: maps, touring information, information on special events, and/or shops or restaurants near the current location of the user. As time goes on further capabilities will be added to digital PCS devices which may involve providing for reception and display of multimedia files such as audio and/or video files.

One problem with such enhanced capabilities is the bandwidth required to transmit the large volume of data associated with such enhanced capabilities from the digital data servers interconnected with the internet to the PCS devices via the direct link. The current cellular phone system uses relatively low bandwidth signaling techniques: on the order of tens of kilobits per second. However, graphical information such as maps and pictures require relatively wide bandwidth to provide reasonable response times. Video and audio files will require even higher bandwidth for reasonable response times. In other words, using the relatively low bandwidth of the current cellular telephone system will require long periods of time to transfer such large amounts of data. These periods of time may be so long as to make the performance unacceptable. Additionally, with the precious spectrum resources, the cost of bandwidth on these networks is relatively high.

Current television signal broadcasting systems provide relatively wide bandwidth capability: approximately 20 Mbps of data throughput for each 6 MHz channel. Terrestrial VHF/UHF frequency bands in the United States include almost 400 MHz of available channels. These channels are receivable in the locale (approximately 70 miles) of the terrestrial television broadcasting station antenna. In addition, current digital direct satellite television broadcasting systems also can provide digital channels which can be used for digital information transmission. Digital data from these channels are receivable over a much wider area: the complete United States, for instance. These channels are not completely used. Thus, there is a vast amount of unused television broadcast spectrum available for other uses.

Some data which will be requested by a user of a PCS device will be unique to that user. For example, a user may request a particular piece of information of interest to that user alone. However, other data will be of simultaneous interest to a large number of users: for example, current weather data, stock market tickers, television or radio program guides, electronic newspapers etc. Yet other information will be of widespread simultaneous interest at only certain times, and of interest only to unique users are other times: for example, traffic maps at rush hour, information related to special events and nearby restaurants and hotels near the time and in the geographical area of the special event; and IRS tax forms and information around tax filing time.

Current bandwidth for cellular phone devices is sufficient to provide unique information to PCS devices as such information is requested. Attempting, however, to provide information of simultaneous widespread interest (e.g. traffic maps) to large numbers of PCS devices at the same time can rapidly use up all available bandwidth of the current PCS system. A PCS communications system which can provide unique information to single requesting PCS devices, and also information of widespread interest simultaneously to large numbers of requesting PCS devices, without overloading available bandwidth of the cellular phone network is desirable.

BRIEF DESCRIPTION OF THE INVENTION

The inventors have realized that one way to overcome the bandwidth limitation of the cellular telephone system is to broadcast information which is of widespread simultaneous interest, receivable by all potential requesting users simultaneously, via a broadcast link. The availability of the relatively large bandwidth in the VHF/UHF frequency band of current terrestrial television broadcasting systems and/or in direct television satellite systems can be utilized to provide this broadcast link to the large number of PCS devices simultaneously.

In accordance with principles of a present invention, a mobile communications system includes a plurality of mobile communications devices. A direct link communicates information between a communications network and a selected one of the plurality of mobile communications devices. A broadcast link simultaneously broadcasts information from the communications network intended to be receivable by the plurality of mobile communications devices.

A mobile communications system according to the present invention includes PCS devices configured to communicate through a direct link interface with a communications network to request desired information. The requested information is either transmitted to the PCS via the direct link from the cellular telephone ground stations, or an indication is transmitted via the direct link that the requested information is currently being broadcast. If requested information is currently being broadcast, then the information which was transmitted to the PCS device via the direct link interface conditions the PCS device to receive the requested information through the broadcast link interface. The received information is then processed in the PCS device in the normal manner.

DETAILED DESCRIPTION OF THE INVENTION

Figure 1:
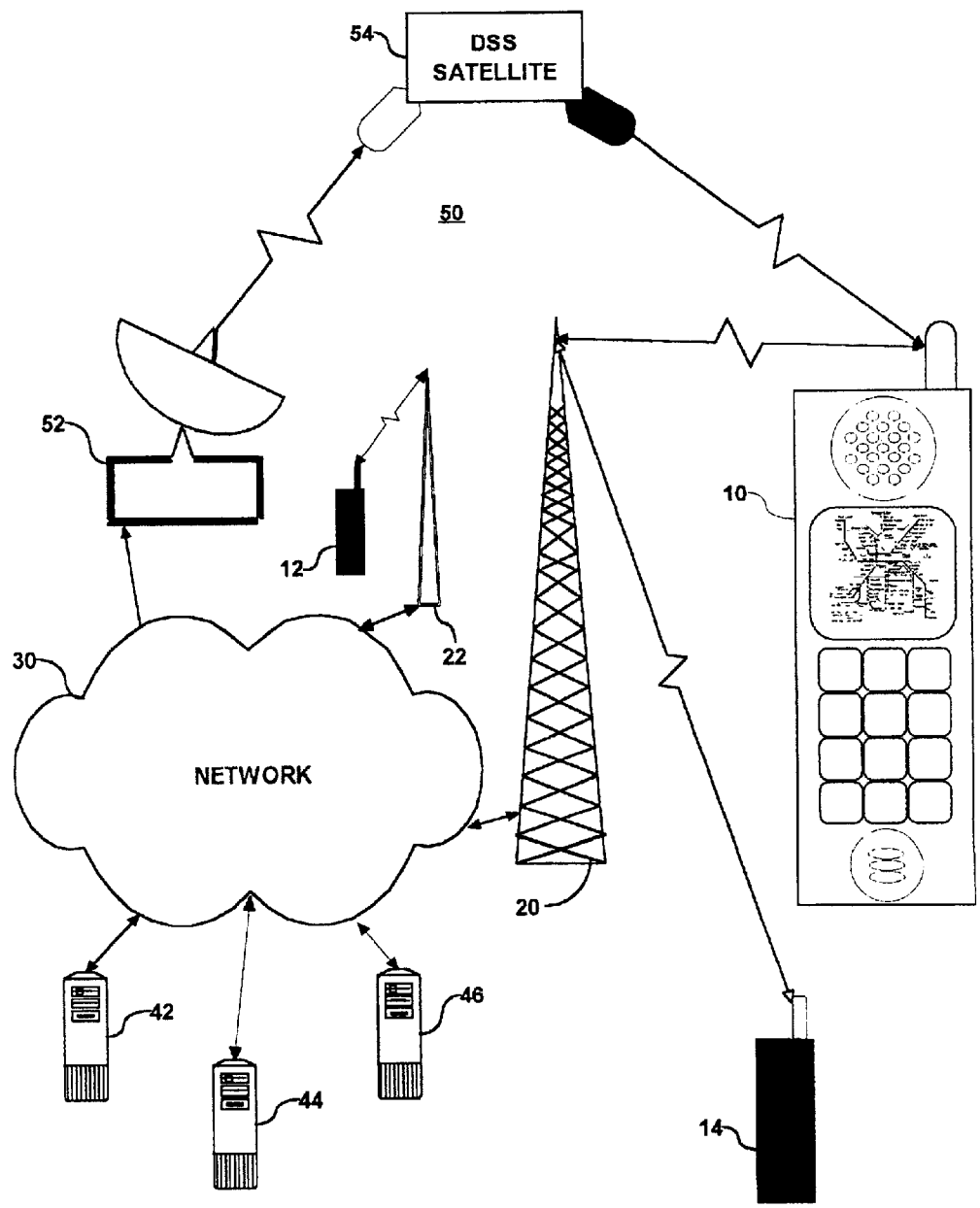
FIG. 1 is a block diagram illustrating a mobile communications system according to principles of the present invention.

FIG. 1 is a block diagram of a mobile communications system according to principles of the present invention. In FIG. 1, a mobile transceiver 10 is in bidirectional communications with a transmitting and receiving antenna 20. The antenna 20 is simultaneously connected to other mobile transceivers, e.g. 14. In addition, other transmitting and receiving antennas, such as antenna 22, are connected to the antenna 20 via a communications network 30. The other antennas, 22, are connected to other mobile transceivers, e.g. 12. In the embodiment illustrated in FIG. 1, the mobile transceivers 10, 12, 14, in cooperation with the antennas 20, 22, and with network 30, possibly including existing land line telephone networks (not shown), interoperate in a known manner for placing, receiving and carrying on wireless telephone conversations. In FIG. 1, the mobile transceiver 10 is configured as a personal communications system (PCS) device, and will be described in more detail below.

Recent developments in the cellular phone system have provided for transmission of digital cellular phone data. In this manner, telephone conversations are digitized and the digitized signal is communicated between the PCS device 10 and antenna 20, and in turn with other cellular phones 12, 14 and land line telephones (not shown). Further developments in the cellular telephone system take advantage of the digital nature of the telephone signal thus communicated with the cellular phone 10. Consequently, it is now proposed to interconnect the cellular phone 10 to a digital computer network, such as the Internet. Cellular phones modified for this operation include not only a speaker, a microphone, and a keypad for entering telephone numbers, but also a display device for displaying the graphical or textual information received from the Internet. Referring again to FIG. 1, the communications network 30 may be considered a digital computer network, such as the Internet, and includes a plurality of computer data servers 42, 44, 46. The servers 42, 44, 46, interact in a known way with requests for data received from other devices connected to the network 30. That is, requests for information are received by the communications network 30 from the PCS device 10 via the antenna 20, and the appropriate data server, 42, 44, 46, provides the requested information to the network 30 which in turn supplies that information to the antenna 20, which in turn transmits the requested information to the PCS device 10. The antenna 20 provides a direct link between the communications network 30 and the PCS device 10.

As described above, sometimes information requested from the computer data servers 42, 44, 46, will be uniquely of interest to the requesting PCS device 10. However, other types of information, possibly as certain times, is expected to be requested simultaneously by multiple PCS devices 10, 12, 14. The data throughput from the network 30 through the antennas 20, 22 to the PCS devices 10, 12, 14, is relatively limited, as described above. If the information simultaneously requested by the multiple PCS devices 10, 12, 14, were supplied individually to each requesting PCS device 10, 12, 14, the data throughput limit of the network 30 would be reached. This would result in the response time of all of the PCS terminals, whether requesting that data or not, extending to unacceptable lengths.

In accordance with principles of a present invention, data expected to be requested simultaneously from multiple PCS devices 10, 12, 14, or during times and locations when such multiple simultaneous requests are expected, is not transmitted through the transmitting antennas 20, 22 to the requesting PCS devices 10, 12, 14. Instead, that data is sent through a broadcast link to the PCS devices 10, 12, 14. More specifically, the data is sent through the communications network 30 to a ground station transmitting antenna 52. The ground station transmitting antenna 52 transmits this information through a channel of a digital direct television satellite system (DSS) satellite 54. The DSS satellite 54 broadcasts the channel containing this data over a wide area in the same manner as transmission of direct satellite television signals. The combination of the ground station transmitting antenna 52 and DSS satellite 54 form a broadcast link 50 between the communications network 30 and the PCS devices 10, 12, 14, for data expected to be of widespread simultaneous interest to PCS devices 10, 12, 14. The PCS device 10, operating in accordance with principles of a present invention, receives the broadcast signal from the broadcast link 50, and processes the information carried by that signal in the same manner as if it had been received on the direct link through the antenna 20.

In the embodiment illustrated in FIG. 1, the broadcast link 50 between the communications network 30 and the PCS device is a DSS satellite system 50. One skilled in the art will understand, however, that terrestrial television transmitters may also be used to broadcast such information. The information from any single terrestrial television transmitter is only receivable within the geographical area of that transmitter. This may be sufficient for data which is of interest only in that geographical area, such as information related to special events in that area. However, by networking multiple terrestrial television transmitters to transmit the same data simultaneously, such data may be made available over a wider geographical area, and could provide the same geographical coverage as the DSS satellite system 50. By broadcasting this information, by either means, over a wide area, in the manner described above, transmission of information satisfying multiple simultaneous individual requests from the computer data servers 42, 44, 46, through the direct link (antenna 20) to PCS devices 10, requiring large amount of data throughput, is obviated. Current terrestrial television broadcasting systems and direct satellite systems include unused channels which may be used for broadcasting such digital data from the data servers 42, 44, 46 to PCS devices 10, 12, 14.

Figure 2:
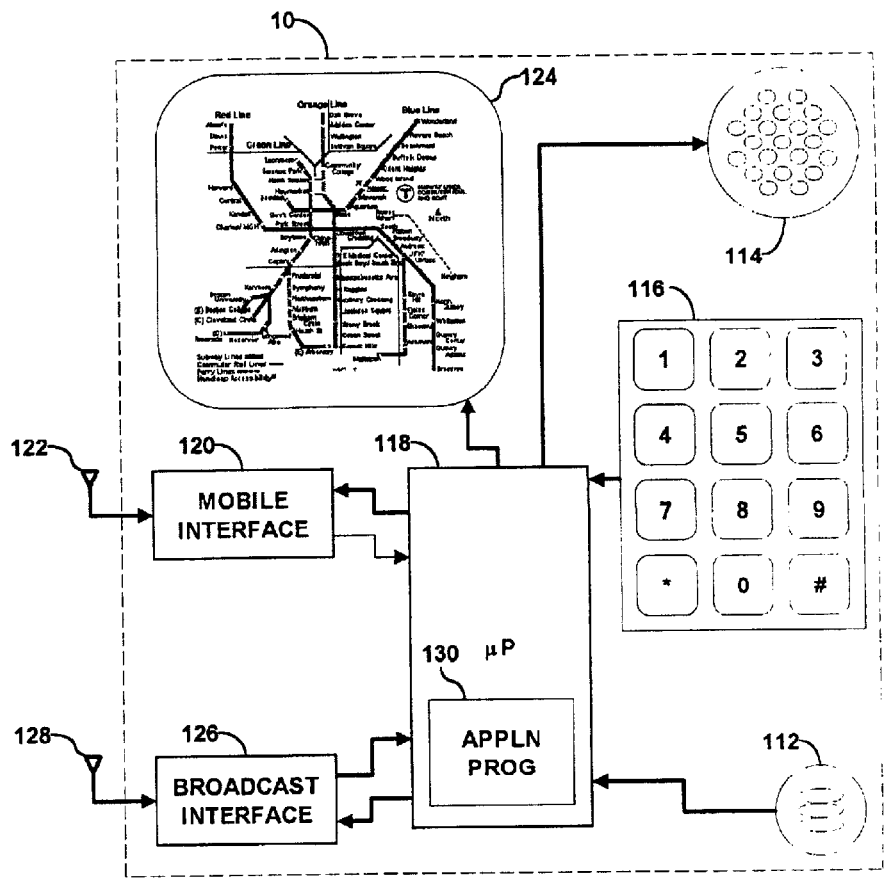
FIG. 2 is a block diagram of a PCS device according to the present invention, which may be used in the system as illustrated in FIG. 1.

FIG. 2 is a block diagram of the mobile communications (PCS) device 10 which may be used in the system illustrated in FIG. 1. In FIG. 2, an antenna 122 is responsive to digital cellular telephone signals from, for instance, a cellular telephone antenna 20 (of FIG. 1). The antenna 122 is bidirectionally coupled to a terminal of a mobile interface circuit 120. An output terminal of the mobile interface circuit 120 is coupled to a direct data input terminal of a microprocessor (□P) 118. A direct data output terminal of the microprocessor 118 is coupled to an input terminal of the mobile interface 120. A speaker output terminal of a microprocessor 118 is coupled to an input terminal of the speaker 114. An output terminal of a microphone 112 is coupled to a microphone input terminal of the microprocessor 118. An output terminal of a keypad 116 is coupled to a control input terminal of the microprocessor 118. The microprocessor 118 operates in a known manner under the control of an application program 130, stored in a memory (e.g. a ROM, not shown) in the microprocessor 118.

The PCS device 10, as described above, operates in a known manner to allow a user to make telephone calls. The user manipulates keys on the keypad 116 to condition the microprocessor 118 to cause the mobile interface circuit 120 to connect to the network 30, generate dialing tones specifying the desired telephone number, and complete the call. Alternatively, signals are received from the network 30 indicating that someone is attempting to call the PCS device 10. In response to these signals, the microprocessor 118 conditions the mobile interface circuit 120 to connect to the network and complete the call.

In either event, signals representing spoken information from the microphone 112 are digitized by the microprocessor 118, and the digitized signal transmitted through the mobile interface 120 and the antenna 122 to the antenna 20 (of FIG. 1). Simultaneously, signals received by the antenna 122 from the antenna 20, and representing received digitized speech information from the other party, are received by the mobile interface 120, converted to a sound signal by the microprocessor 118, and supplied to the speaker 114.

As described above, recent developments PCS devices 10 provide the capability of requesting and receiving information from e.g. the Internet. Data representing requested information may maybe generated by the user using the keypad 116 (which may have more keys than the illustrated number keys). The information request is supplied by the microprocessor 118 to mobile interface 120, which in turn supplies the information via the antenna 122 to the antenna 20 (of FIG. 1) which routes that information through the network 30 to the computer data servers 42, 44, 46. The computer data server, 42, 44, 46 containing the desired information places that information on the network 30 where it is transmitted by the antenna 20 to the PCS device 10. The PCS device 10 receives the signal carrying this information at antenna 122. The mobile interface 120 extracts the requested information and supplies it to the microprocessor 118. The microprocessor 118 processes the received information to generate e.g. an image on the display device 124 representing the requested information. In the illustrated embodiment, this information is a map of the transportation system of a city, and the image of this map is displayed on the display device 124. As described above, this method of receiving data via the direct link from the computer data server 42, 44, 46 requires a minimum data throughput in order for that information to be received in a reasonable amount time. Simultaneous requests for the same information by many PCS devices 10, 12, 14 will use up the available data throughput through the plurality of antennas 20, 22.

The PCS device 10 illustrated in FIG. 2, further includes a receiving antenna 128 coupled to a broadcast interface circuit 126. One skilled in the art will understand that the receiving antenna 128 may be combined with the antenna 20 in a single unit, or a single antenna may provide signals in common to the mobile interface 120 and broadcast interface 126. A broadcast data output terminal of the broadcast interface 126 is coupled to a broadcast data input terminal of the microprocessor 118. A channel selection output terminal of the microprocessor 118 is coupled to a control input terminal of the broadcast interface 126.

In operation, information which is transmitted via the broadcast link 50, e.g. a satellite system (of FIG. 1), is received by be antenna 128 and processed by the broadcast interface 126. The broadcast interface 126 receives the data carried by the broadcast signal, and supplies that data to the microprocessor 118. The microprocessor 118 extracts the requested information, and processes this information in the same manner as it would have if that information had come from the mobile interface 120.

More specifically, in the embodiment illustrated in FIG. 2, the user manipulates the keypad 116 to specify a request for e.g. the city transportation map. The information request is transmitted to the computer data servers 42, 44, 46 using the direct link (mobile interface 120, antenna 122, antenna 20 and communications network 30), as described above. In this case, however, the transportation map information is currently being broadcast via the broadcast link 50. This condition may be permanent based on the expectation that this information will always be subject to widespread simultaneous requests (news), or this condition may be selective based on time (rush hour) and/or location (in the vicinity of the city). In the latter case, the information may be broadcast from terrestrial television transmitting antennas (not shown) in the vicinity of the city. Alternatively, this condition may be made adaptive in which case when large numbers of requests are simultaneously received, a decision is made to broadcast the information until the number of requests diminishes.

Data is transmitted from the appropriate one of the computer data servers, 42,44,46, through the communications network 30 to the microprocessor 118 through the direct link (antenna 20, antenna 122, mobile interface 120) to indicate that this information is currently being broadcast, and to specify the channel over which the requested information is being broadcast. In response to this information, the microprocessor 118 supplies a tuning signal to the broadcast interface 126 conditioning the broadcast interface 126 to tune to the specified channel. The broadcast interface 126 receives the specified broadcast signal and supplies the data carried by that signal to the microprocessor 118. The microprocessor 118 extracts the requested information from the broadcast interface 126 and processes it in the same manner as if it had been received via the mobile interface 120. In the embodiment illustrated in FIG. 2, an image represented by that information is displayed on the display device 124.

As described above, with the addition of the antenna 128 and broadcast interface 126, and with appropriate changes to the application program 130 of the microprocessor 118, a PCS device 10 may be adapted to receive requested information either by a direct link (transmitting antenna 20), or by a broadcast link 50, if the requested information is currently being broadcast. If the information is being broadcast, information is sent through the direct link which conditions the PCS device 10 to tune to the desired channel of the broadcast link 50 to receive the requested information. Using the broadcast link 50 in this manner minimizes the data throughput required by the direct link.

What is claimed is:

1. A mobile communications device, comprising:
   a first interface for communicating information with a communications network via a direct link; and
   a second interface for receiving information from the communications network via a broadcast link; and
   an adaptive device for detecting information requested via said first interface on the broadcast link and controlling said device to receive information from the broadcast link via said second interface.

2. The device of claim 1 wherein the first interface comprises a mobile telephone interface.

3. The device of claim 2 wherein the mobile telephone interface comprises a cellular telephone interface.

4. The device of claim 1 wherein the second interface comprises a television broadcast receiver interface.

5. The device of claim 4 wherein the television broadcast receiver interface comprises a terrestrial television broadcast receiver interface.

6. The device of claim 4 wherein the television broadcast receiver interface comprises a direct television satellite system broadcast receiver interface.

7. The device of claim 1 wherein said adaptive device is coupled to the direct link interface and the broadcast link interface, for conditioning the mobile communications device to receive information from one of the direct link or the broadcast link in response to previously received data.

8. The device of claim 7 wherein the device further comprises:
   a device, coupled to the adaptive device, for receiving user input; wherein the adaptive device is responsive to user input specifying information to be requested from the communications network, and provides data representing the requested information to the communications network via the direct link.

9. The device of claim 8 wherein the user input receiving device comprises a keypad.

10. The device of claim 8 wherein the adaptive device receives data via the first interface indicating that the requested information is being broadcast via the broadcast link and receives the requested information via the broadcast link.

11. The device of claim 8 wherein if the adaptive device receives data from the first interface indicating that the requested information is being broadcast via the broadcast link then the adaptive device receives the requested information via the broadcast link, otherwise the controller receives the requested data via the direct link.

12. The device of claim 8 wherein the broadcast link comprises a plurality of channels; and:
   if the adaptive device receives data via the first interface indicating that the requested information is being broadcast via a selected one of the plurality of channels on the broadcast link then the adaptive device receives the requested information from the selected channel of the broadcast link, otherwise the adaptive device receives the requested data via the direct link.

13. The device of claim 1 further comprising a display device, for displaying an image represented by requested information received from the communications network.

14. In a system comprising a plurality of mobile communications devices and a communications network, a method of operating a selected one of the plurality of mobile communications devices, comprising the steps of:
   receiving information from the communications network intended for the selected mobile communications device via a direct link to the selected mobile communications device;
   detecting information requested via the direct link being transmitted by the communications network for the plurality of mobile communications devices; and
   receiving said detected information from the communications network intended for the plurality of mobile communications devices, including the selected mobile communications device, via a broadcast link.

15. The method of claim 14 wherein the step of receiving information via the direct link comprises the step of receiving information via a telephone network.

16. The method of claim 15 wherein the step of receiving information via the telephone network comprises the step of receiving information via a cellular telephone network.

17. The method of claim 14 wherein the step of receiving information via the broadcast link comprises the step of receiving information via a television broadcast network.

18. The method of claim 17 wherein the step of receiving information via the television broadcast network comprises the step of receiving information via a terrestrial television broadcast network.

19. The method of claim 14 wherein the step of receiving information via the television broadcast network comprises the step of receiving information via a direct satellite television broadcast network.

20. The method of claim 14 further comprising the steps of:
   transmitting data representing requested information to the communications network from the selected mobile communications device; and
   receiving the requested information by the mobile communications device from the communications network via one of the direct link and the broadcast link.

21. The method of claim 20 wherein the step of receiving the requested information comprises the steps of:
   if the requested information is being transmitted from the communications network via the broadcast link, receiving data from the communications network via the direct link specifying that the requested information is being transmitted from the communications network via the broadcast link and, in response to the received data, receiving the requested information from the communications network via the broadcast link;
   otherwise receiving the requested information from the communications network via the direct link.

22. The method of claim 21 wherein the broadcast link comprises a plurality of channels, and the step of receiving the requested information further comprises the steps of:
   receiving data from the communications network via the direct link specifying that the requested information is being transmitted on a selected one of the plurality of channels of the broadcast link; and
   if the requested information is being transmitted from the communications network via the broadcast link, receiving the requested information from the communications network via the selected channel of the broadcast link.

* * * * *